(12) United States Patent
Ting (10) Patent No.: US 9,155,288 B1
(45) Date of Patent: Oct. 13, 2015

(54) FISH TANK WITH A FUNCTION OF DISCHARGING WASTE WATER FROM A BOTTOM THEREOF

(71) Applicant: Shao-Chieh Ting, New Taipei (TW)

(72) Inventor: Shao-Chieh Ting, New Taipei (TW)

(*) Notice: Subject to any disclaimer, the term of this patent is extended or adjusted under 35 U.S.C. 154(b) by 0 days.

(21) Appl. No.: 14/261,692

(22) Filed: Apr. 25, 2014

(51) Int. Cl.
*A01K 61/00* (2006.01)
*A01K 63/00* (2006.01)
*A01K 63/06* (2006.01)
*A01K 63/04* (2006.01)

(52) U.S. Cl.
CPC .............. *A01K 63/003* (2013.01); *A01K 61/00* (2013.01); *A01K 63/045* (2013.01); *A01K 63/06* (2013.01)

(58) Field of Classification Search
CPC ... A01K 63/006; A01K 63/003; A01K 63/04; A01K 61/00; A01K 61/008
USPC ......... 119/217, 245, 246, 247, 248, 251, 252, 119/200, 215, 269
See application file for complete search history.

(56) References Cited

U.S. PATENT DOCUMENTS

| | | | | |
|---|---|---|---|---|
| 3,291,098 A * | 12/1966 | Halpert | ............... | 119/252 |
| 3,464,387 A * | 9/1969 | Martinez | ............... | 119/252 |
| 3,651,785 A * | 3/1972 | Quinn | ............... | 119/248 |
| 4,120,265 A * | 10/1978 | Davis | ............... | 119/248 |
| 4,323,032 A * | 4/1982 | Halfon | ............... | 119/248 |
| 5,133,288 A * | 7/1992 | Humphrey | ............... | 119/248 |
| 5,144,909 A * | 9/1992 | Tominaga | ............... | 119/248 |
| 5,588,396 A * | 12/1996 | Yoshida | ............... | 119/252 |
| 5,849,185 A * | 12/1998 | Judy, Jr. | ............... | 210/167.23 |
| 6,443,099 B1 * | 9/2002 | Boggs | ............... | 119/248 |
| 6,474,265 B1 * | 11/2002 | Powell | ............... | 119/248 |
| 6,536,374 B1 * | 3/2003 | Suerth et al. | ............... | 119/248 |
| 7,243,613 B2 * | 7/2007 | Holms et al. | ............... | 119/248 |
| 2006/0191828 A1 * | 8/2006 | Cummins | ............... | 210/97 |
| 2008/0314811 A1 * | 12/2008 | Smith | ............... | 210/167.21 |

* cited by examiner

*Primary Examiner* — Yvonne Abbott-Lewis
(74) *Attorney, Agent, or Firm* — Jackson IPG PLLC; Demian K. Jackson (57) ABSTRACT

The present invention discloses a fish tank with a function of discharging waste water from a bottom thereof. A side at a bottom of the fish tank body is provided with a drain hole which is connected to an L-shaped tube, such that by rotating low the L-shaped tube, the waste water at the bottom of the fish tank can be discharged and by rotating high the L-shaped tube, the fresh water can be stored in the fish tank. Moreover, by providing a V-shaped transparent baffle, a bottom mud plate, a submerged motor and a breeder box which is hung up outside the fish tank, a closed food chain system is formed in the fish tank, allowing aquarium breeding to be simpler and easier.

3 Claims, 12 Drawing Sheets

FISH TANK WITH A FUNCTION OF DISCHARGING WASTE WATER FROM A BOTTOM THEREOF

BACKGROUND OF THE INVENTION a) Field of the Invention

The present invention relates to a fish tank with a function of discharging waste water from a bottom thereof, and more particularly to a fish tank in which one side at a bottom of the fish tank body is provided with a drain hole connecting to an L-shaped tube, such that by rotating low the L-shaped tube, the waste water at the bottom of the fish tank can be discharged and by rotating high the L-shaped tube, fresh water can be stored in the fish tank. In addition, by providing a V-shaped transparent baffle, a bottom mud plate, a submerged motor and a breeder box which is hung up outside the fish tank, a closed food chain system can be achieved for the fish tank, allowing aquarium breeding to be simpler and easier.

b) Description of the Prior Art

Many people in a modern society will breed aquatic animals or plants in a room or an office site to release work pressure by breeding the aquatic animals or plants. However, the most common method of breeding the aquatic animals or plants in a room or an office site is to use a glass fish tank and an air conditioner which maintains oxygen needed in the fish tank. More fastidiously, a lighting device will be installed above the glass tank to maintain proper brightness.

The abovementioned simple fish tank can be used to breed the aquatic animals or plants. Nevertheless, there are a lot of problems utilizing the abovementioned fish tank to breed the aquatic animals or plants and the most serious one is the death of aquatic animals as oxygen in tank water is not enough or ammonium is too dense in the tank water. Besides that, almost the entire fish tank needs to be dealt with once upon cleaning the fish tank and replacing the tank water, which is very time and labor consuming and therefore is the issue that is most worried of when people breed the aquatic animals or plants.

Accordingly, the present invention discloses a fish tank with a function of discharging the waste water from the bottom thereof, which saves time and labor in cleaning the fish tank and constitutes a closed food chain system in the fish tank, thereby providing a best environment for breeding the aquatic animals or plants and reducing a work load of breeders.

SUMMARY OF THE INVENTION

A primary object of the present invention is to provide a fish tank with a function of discharging waste water from a bottom thereof, including primarily a fish tank body, a fish tank cover, an aquarium light and a breeder box which is hung up outside the fish tank. An interior of the fish tank body is provided with a bottom mud filtering plate, a V-shaped transparent baffle, a fan-shaped water outlet assembly, a transparent water baffle, a transparent water tube, an adapter and a submerged motor; whereas, an exterior of the fish tank body is provided with an L-shaped tube. Therefore, a fish breeding tank which is able to breed the aquatic animals or plants conveniently is provided, and the closed food chain system can be formed in the fish tank.

Another object of the present invention is to provide a fish tank with a function of discharging waste water from a bottom thereof, wherein one side at a bottom of the fish tank body is provided with a drain hole which is connected to the L-shaped tube, constituting a communicating vessel by the fish tank body and the L-shaped tube. When rotating low the L-shaped tube, waste water can be discharged from the L-shaped tube and the water level of the fish tank after discharging the waste water will be at a horizontal position of the opening of the L-shaped tube. By this way of discharging the waste water, the time and labor can be saved. On the other hand, when rotating high the L-shaped tube, fresh water can be stored in the fish tank.

Still another object of the present invention is to disclose a fish tank with a function of discharging waste water from a bottom thereof, wherein by providing a flow regulating valve (not shown in the drawings) on the fan-shaped water outlet assembly, water which is drawn out by the submerged motor can be diverted to the external breeder box, and the flow of the breeder box can be also adjusted by the flow regulating valve.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
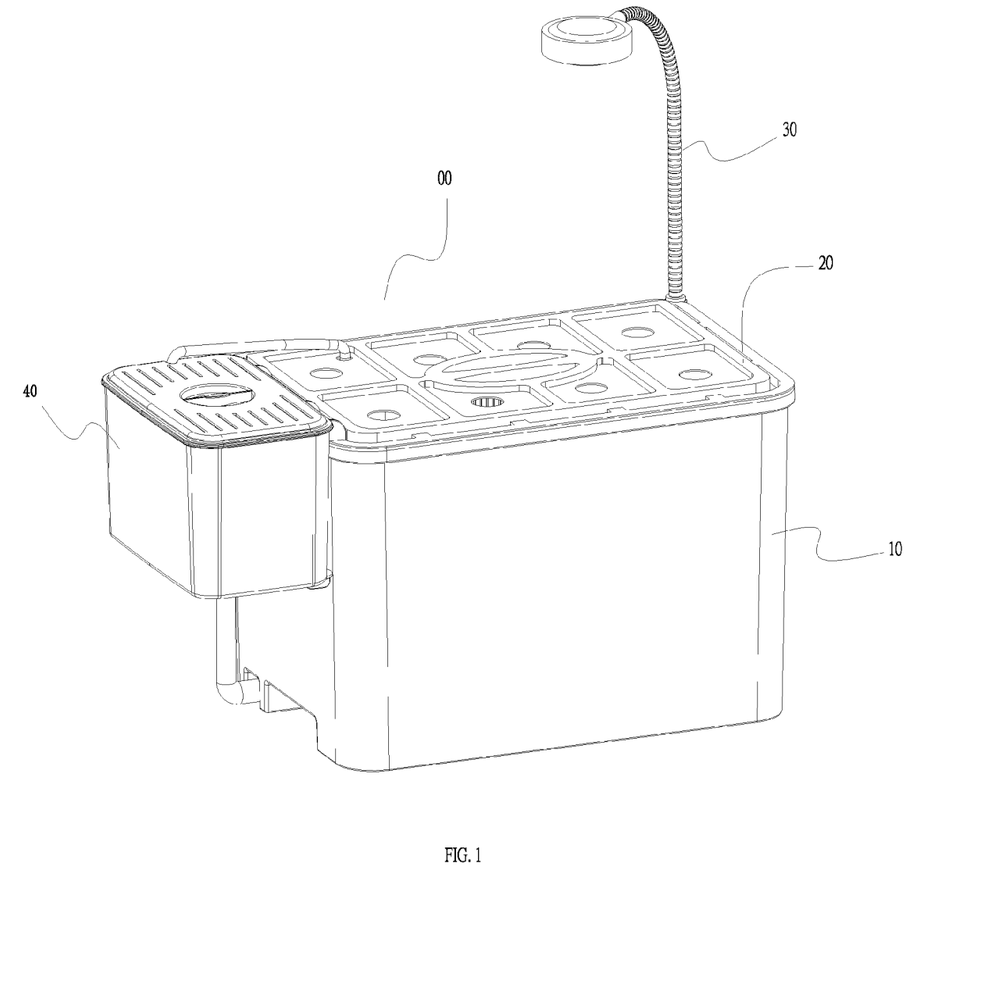
FIG. 1 shows a three-dimensional schematic view of the present invention after being assembled together.
Figure 2:
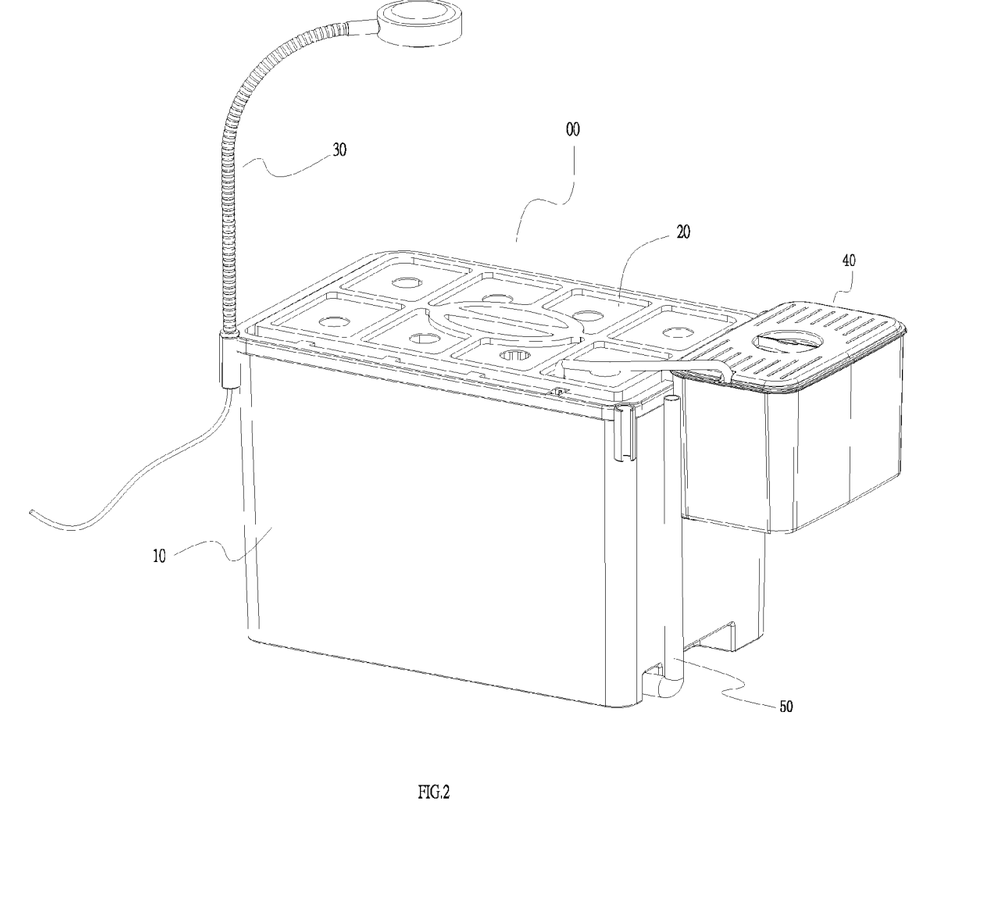
FIG. 2 shows a three-dimensional schematic view of the present invention after being assembled together, viewing from another view angle.

Referring to FIG. 1 and FIG. 2, a fish tank with a function of discharging waste water from a bottom thereof 00, according to the present invention, comprises primarily a fish tank body 10, a fish tank cover 20, an aquarium light 30, a breeder box 40 hung up outside the fish tank body 10 and an L-shaped tube 50.

Figure 3:
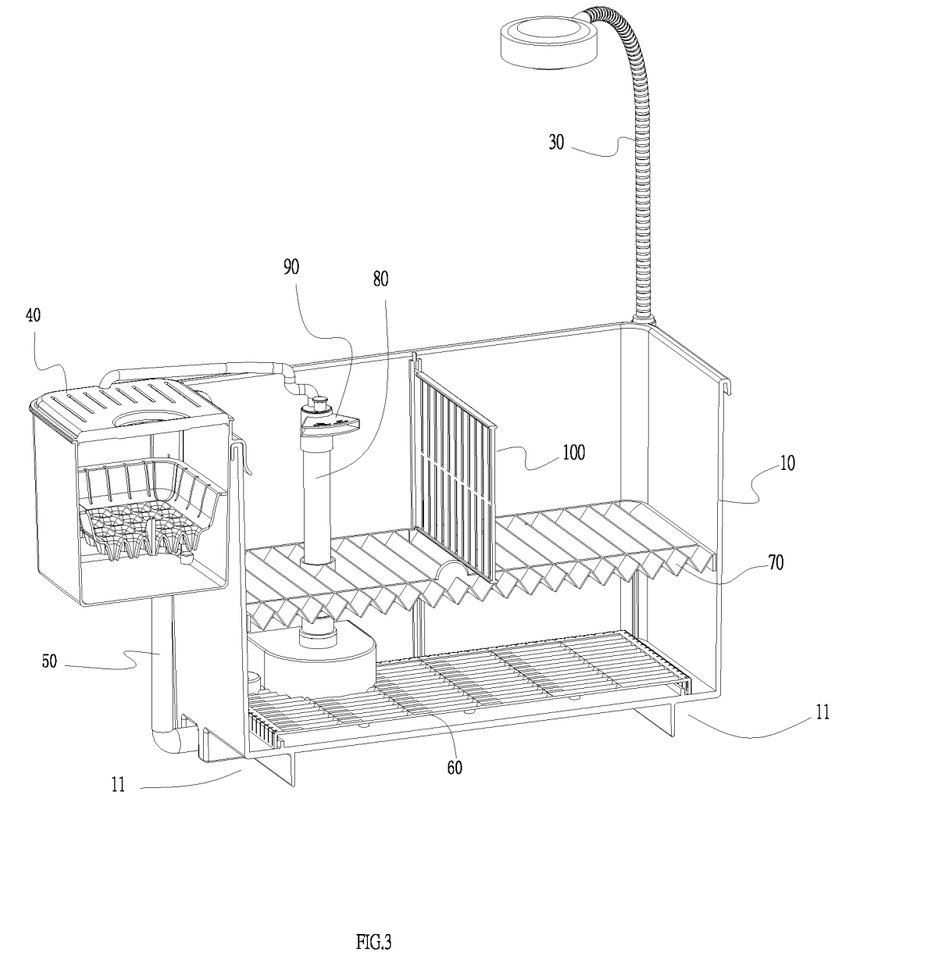
FIG. 3 shows a three-dimensional cutaway view of the present invention, after being assembled together.
Figure 4:
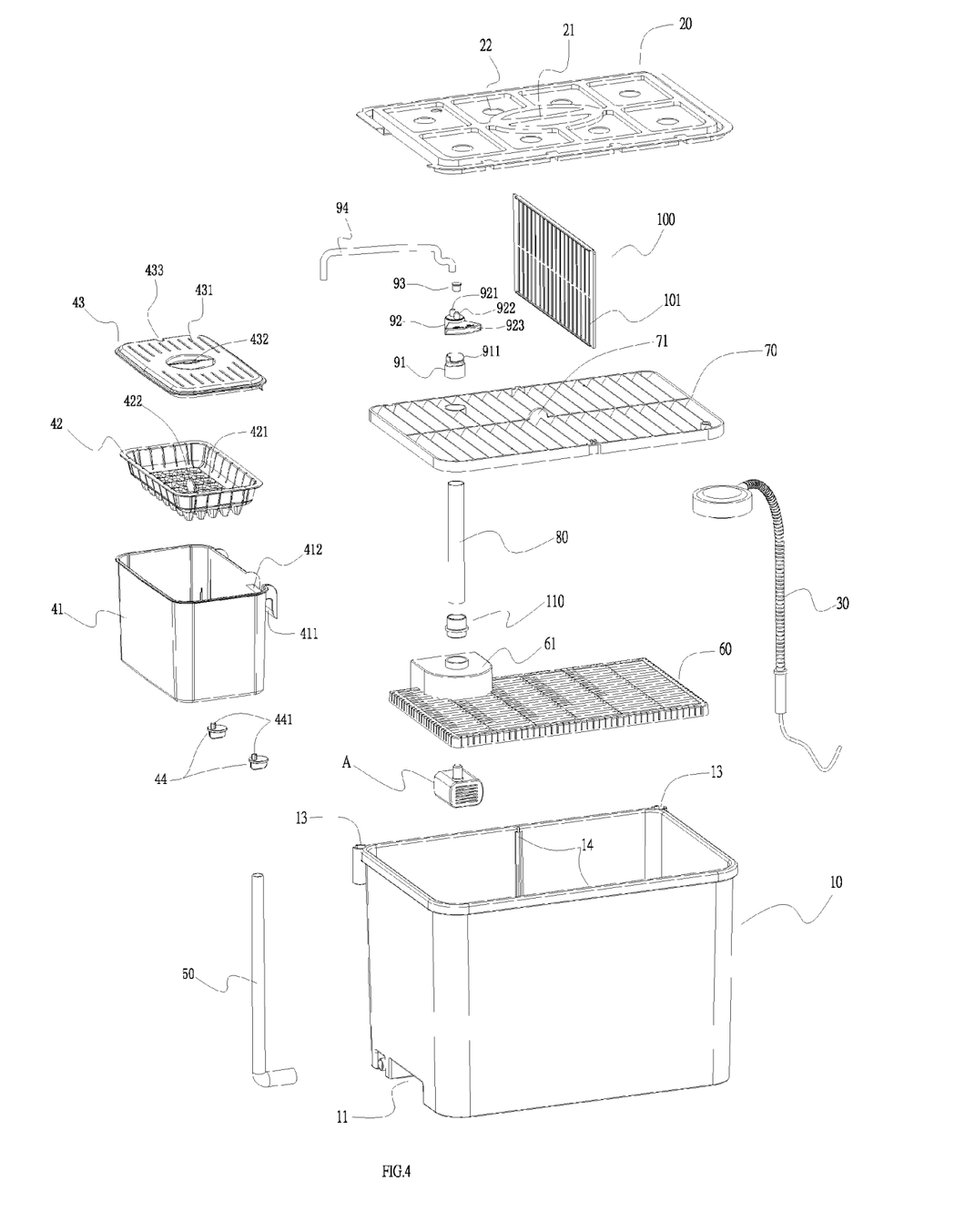
FIG. 4 shows a three-dimensional exploded view of the present invention.

As shown in FIG. 3 (along with FIG. 4 at a same time), an interior of the fish tank body 10 is provided with a bottom mud filtering plate 60, a V-shaped transparent baffle 70, a transparent plastic tube 80, a fan-shaped water outlet assembly 90, a transparent water baffle 100, an adapter 110 and a submerged water pumping motor A.

Referring to FIGS. 3 to 7D, a bottom at each of two sides of the fish tank body 10 is provided with a handle groove 11 to facilitate moving the fish tank by hands. A left rear side at the bottom of the fish tank body 10 is provided with a drain hole 12 which is connected to the L-shaped tube 50. By rotating low the L-shaped tube 50, waste water in the fish tank can be discharged. Each of two sides at a rear top of the fish tank body 10 is provided with an aquarium light clamp 13 to secure the aquarium light 30. A front and rear wall inside the fish tank body 10 are provided respectively with a U-shaped notch 14. When the transparent water baffle 100 is inserted into the U-shaped notches 14, a function of allowing angelfishes to kiss with each other or fighting fishes to fight with each other imaginarily is provided. On the other hand, if this transparent water baffle 100 is removed, then the angelfishes can pair up with each other or the fighting fishes can actually fight with each other.

The fish tank cover 20 is made of a transparent material and can prevent fishes from jumping out of the fish tank. The fish tank cover 20 is provided with a finger handle 21 and plural ventilation holes 22.

The aquarium light 30 can provide proper illumination to the fish tank and is installed conveniently by just snapping into the aquarium light clamps 13 disposed on the fish tank body 10.

Figure 6:
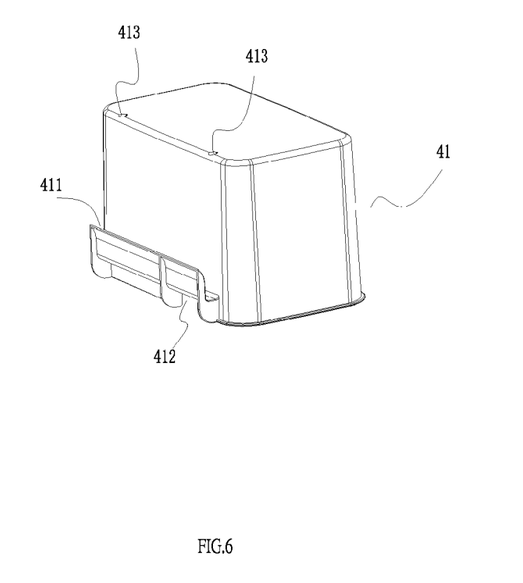
FIG. 6 shows a three-dimensional schematic view at bottom of a breeder box body of the present invention.
Figure 7:
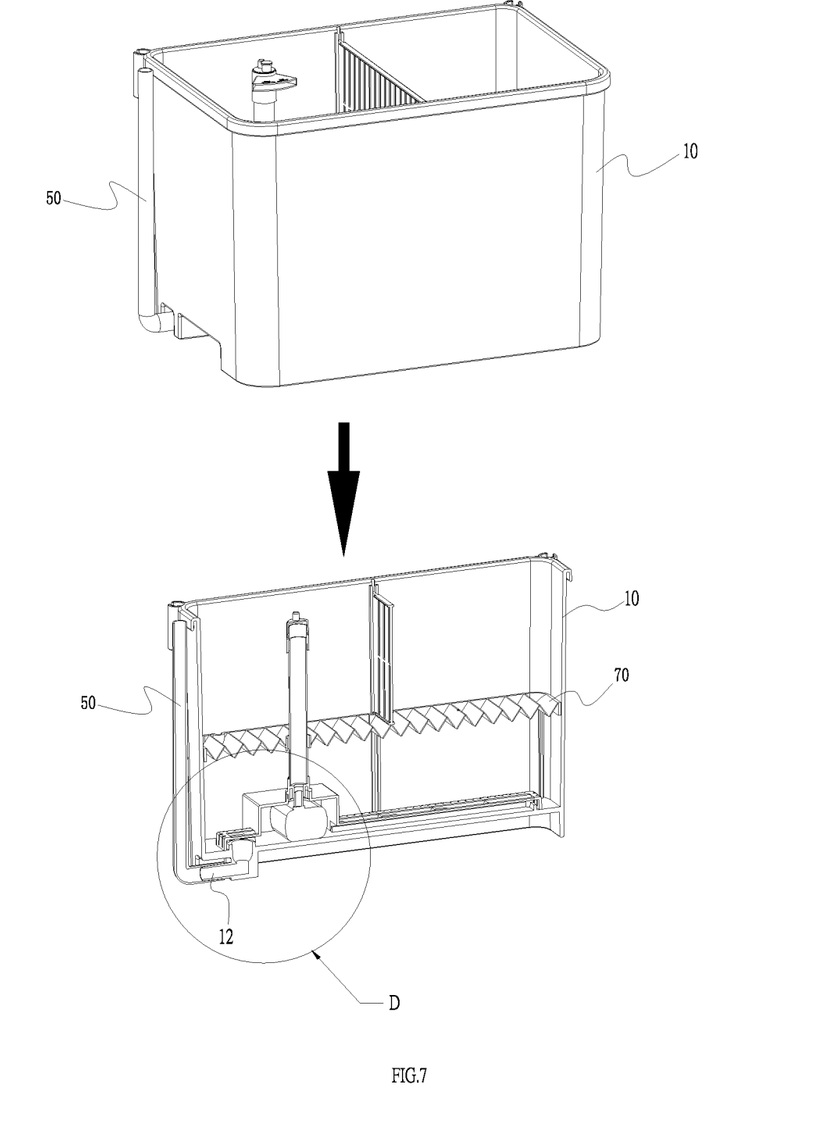
FIG. 7 shows a three-dimensional cutaway view along a vertical cross section of the drain hole of the present invention.
Figure 7D:
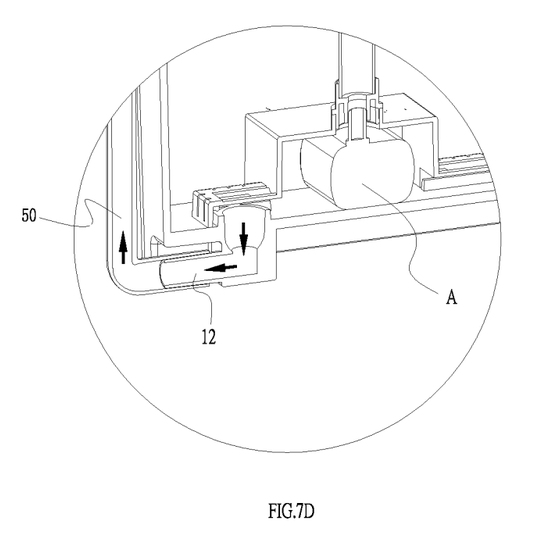
FIG. 7D shows a local enlarged schematic view of a water pumping motor and a water discharging device in FIG. 7.
Figure 8:
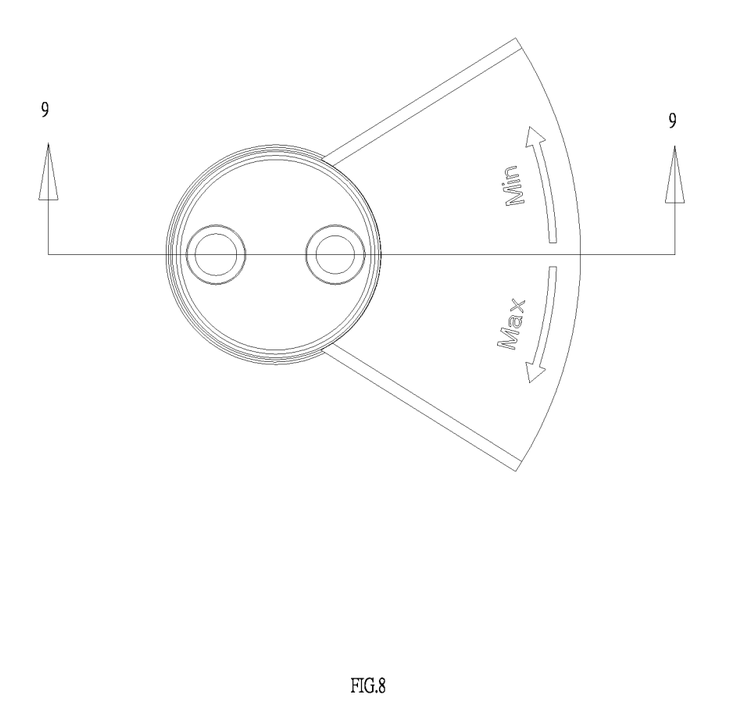
FIG. 8 shows a plan view at a fan-shaped water outlet of the present invention.
Figure 9:
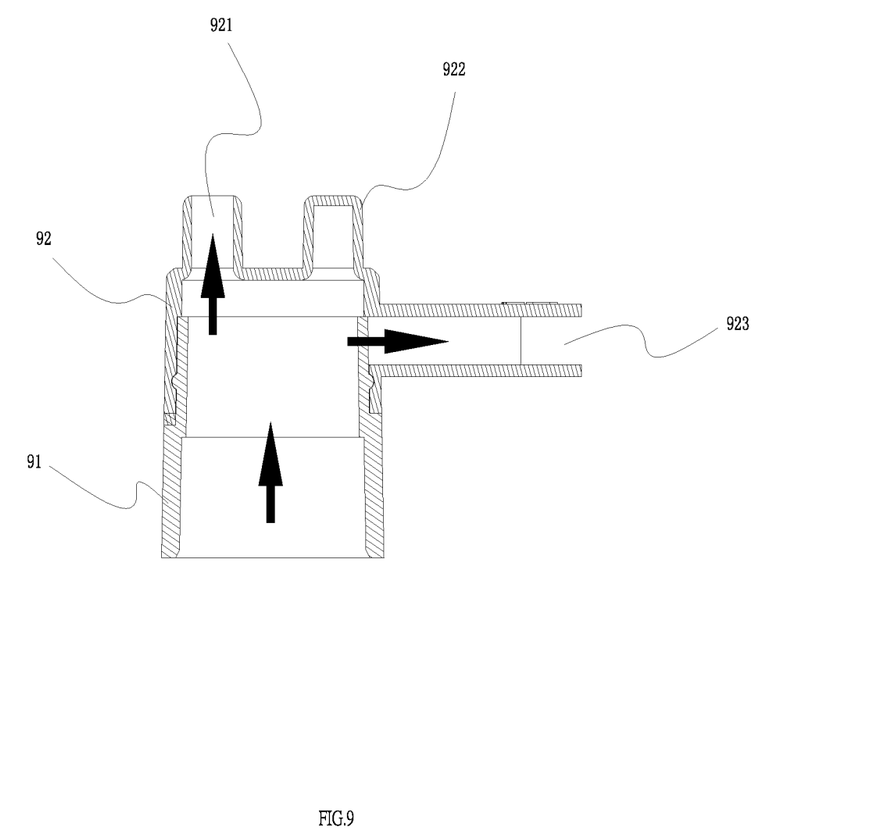
FIG. 9 shows a vertical cross sectional view of the fan-shaped water outlet in FIG. 8.
Figure 10:
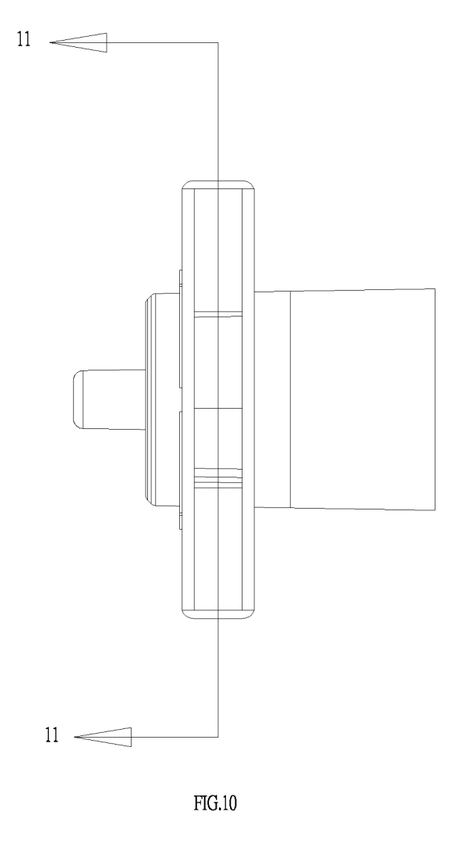
FIG. 10 shows a side view of the fan-shaped water outlet of the present invention.
Figure 11:
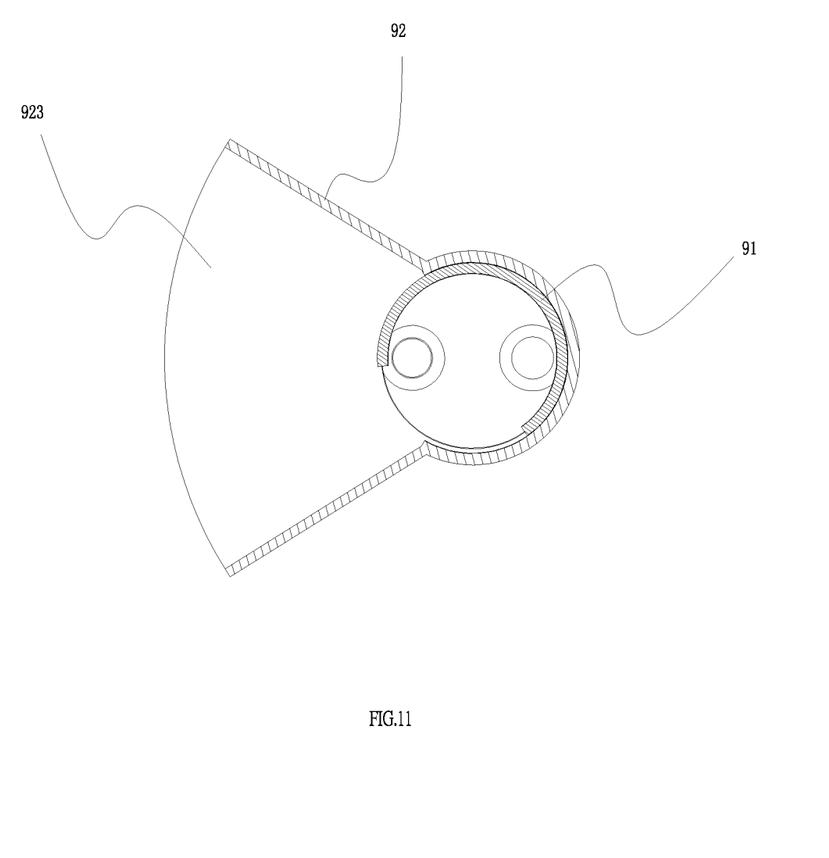
FIG. 11 shows a horizontal cross sectional view of the fan-shaped water outlet in FIG. 10.

The external breeder box 40 is used for the angelfishes to give birth to baby fishes and is constituted by a box body 41, a funnel 42, a box cover 43 and plural regulating disks 44. The box body 41 is provided with a hook 411 (to hang up the breeder box 40 on a side wall of the fish tank), a diversion trench 412 and plural fixing holes 413 (to secure the regulating disks 44). The funnel 42 is provided with plural diversion holes 421 (after being born, the baby fishes can enter into a lower layer of the breeder box 40 from these holes, avoiding being devoured by big fishes) and a finger handle 422 to facilitate removing the funnel 42. The box cover 43 is provided with plural ventilation holes 431, a finger handle 432 and a slot 433 which is used to secure a bypass hose 94. Each regulating disk 44 is provided with a pivot 441 which is sheathed with the fixing hole 413 on the box body 41, thereby achieving the purpose of adjusting the horizontal position of the breeder box 40.

The L-shaped tube 50 is used to connect to the drain hole 12 disposed on the fish tank body 10, forming a communicating vessel. By rotating the height of the L-shaped tube 50, the waste water can be discharged from the fish tank and fresh water can be stored in the fish tank.

The bottom mud filtering plate 60 is provided with a motor chamber 61 to install the submerged water pumping motor A. By the submerged water pumping motor A, the tank water will flow through a bottom mud layer and will then be withdrawn out. As the mud layer contains a plenty of oxygen, a lot of nitrifying bacteria can be used to filter and decompose the mud. The bottom mud filtering plate 60 is then combined with a discharging system at the bottom of the fish tank, which will save time and labor in cleaning the bottom mud, so as to prevent the fish tank from being clogged by the bottom mud, forming an anaerobic zone that is bad for the growth of water weeds.

Through the V-shaped transparent baffle 70, an angelfish breeding tank and a food chain in the tank can be formed; fishes are bred in an upper layer of the V-shaped transparent baffle 70, whereas little shrimps and water fleas are bred in a lower layer of the V-shaped transparent baffle 70. When feedstuffs are given to little fishes in the upper layer, residuals of the feedstuffs will descend to the lower layer, and little shrimps will eat the granules of the residuals, whereas water fleas will consume particles of the residuals and bacteria in the tank water. Therefore, little shrimps and water fleas will survive and breed in the lower layer, becoming baits of the abovementioned little fishes when these little shrimps and water fleas, as well as the just born little shrimps and water fleas swim from the lower layer to the upper layer (water fleas will swim to the water surface in the dawn, and an angelfish breeding plate only allows a small amount of the water fleas in the breeder box to swim to the water surface), thereby forming the food chain in the tank and alleviating the need for replacing water in the fish tank. The V-shaped transparent baffle 70 is provided with a finger handle 71 to facilitate inserting and removing the V-shaped transparent baffle 70.

An end of the transparent plastic tube 80 is sheathed on the adapter 110 (the other end of the adapter 110 is connected to a pumping hole of the submerged water pumping motor A) and the other end is sheathed with the fan-shaped water outlet assembly 90, thereby achieving the effect of filtering the bottom mud.

Referring to FIG. 3, FIG. 4 and FIGS. 8 to 11, the fan-shaped water outlet assembly 90 is sheathed on the transparent plastic tube 80 to divert water flow. The fan-shaped water outlet assembly 90 is formed by a sleeve 91 (having a gap 911 which fits with a fan-shaped water outlet 92 to adjust the water flow), the fan-shaped water outlet 92 (having a bypass port 921, a fixing column 922 and a diversion port 923), a water plug 93 (sheathed on the bypass port 921 when there is no need to bypass the water flow to the breeder box 40) and the bypass hose 94, thereby diverting the water flow to the breeder box 40.

Figure 5:
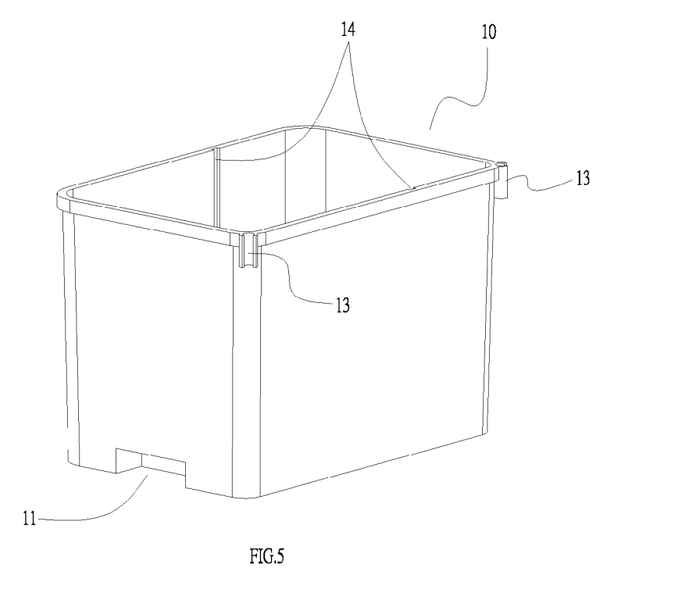
FIG. 5 shows a three-dimensional schematic view at a rear side of the fish tank body of the present invention.

The transparent water baffle 100 is provided with plural water holes 101. When the transparent water baffle 100 is inserted into the U-shaped notches 14 (as shown in FIG. 5) on the fish tank body 10, the functions of allowing the angelfishes to kiss with each other and the fighting fishes to fight with each other imaginarily, or of separating the angelfishes and separating the fighting fishes without fighting, can be achieved. On the other hand, if the transparent water baffle 100 is removed, then the angelfishes can pair up with each other and the fighting fishes can actually fight with each other.

An end of the adapter 110 is sheathed at a water outlet of the submerged water pumping motor A, and the other end is connected to the transparent plastic tube 80.

Figure 12:
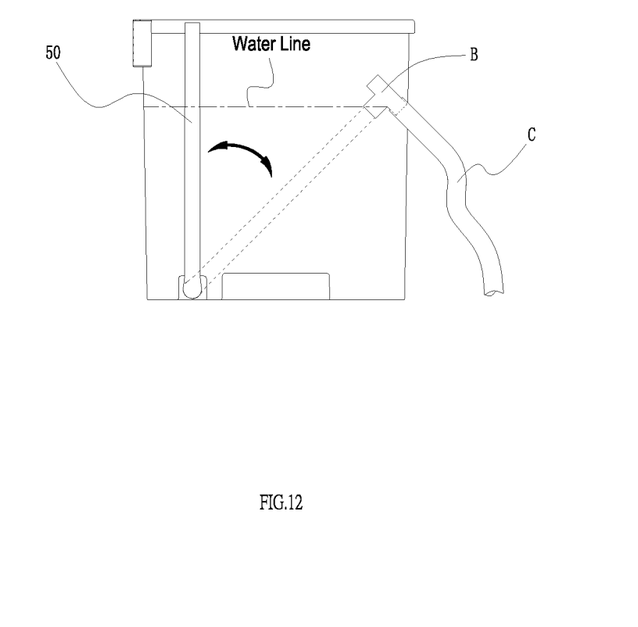
FIG. 12 shows a schematic view of discharging the waste water after rotating the L-shaped tube of the present invention.

Referring to FIG. 12, it discloses a schematic view of discharging the waste water according to the present invention, wherein a T-shaped tube B and a discharge hose C are connected together and the L-shaped tube 50 is rotated by an angle to discharge the waste water, with that the discharge capacity can be controlled by the rotation angle of the L-shaped tube 50.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A fish tank with a function of discharging waste water from a bottom thereof, comprising:
   a fish tank body, a left rear side at a bottom of the fish tank body is provided with a drain hole, thereby allowing the waste water to be discharged from the drain hole;
   a fish tank cover, the fish tank cover prevents fishes from jumping out of the fish tank;
   an aquarium light, the aquarium light provides the fish tank with proper brightness;

a breeder box, the breeder box provides angelfishes to give birth to baby fishes;

an L-shaped tube, the L-shaped tube controls discharging of the waste water from the fish tank and storing fresh water in the fish tank;

a bottom mud filtering plate, a lower side of the bottom mud filtering plate is provided with a submerged water pumping motor;

a V-shaped transparent baffle, the V-shaped transparent baffle achieves the functions of an angelfish breeding tank and forms a food chain in the fish tank;

a transparent plastic tube, the transparent plastic tube fits with the submerged water pumping motor to filter bottom mud in the fish tank;

a fan-shaped water outlet assembly, the fan-shaped water outlet assembly bypasses tank water to the breeder box and diverts water flow to the fish tank body;

a transparent water baffle, the transparent water baffle is inserted or removed to achieve the functions of allowing the angelfishes to kiss with each other and fighting fishes to fight with each other imaginarily, or of separating the angelfishes and separating the fighting fishes to achieve the function of not fighting with each other; and an adapter, the adapter is connected to the submerged water pumping motor and the transparent plastic tube;

wherein, a fish breeding tank being provided to facilitate breeding of the fishes and a closed food chain system being formed in the fish tank.

2. The fish tank with a function of discharging waste water from a bottom thereof, according to claim 1, wherein a communicating vessel is formed by connecting the drain hole at the bottom of the fish tank to the L-shaped tube, and by rotating height of the L-shaped tube, the waste water is charged from the fish tank or the fresh water is stored in the fish tank, such that a horizontal position of the opening of the L-shaped tube is at a water level of the fish tank after discharge the waste water.

3. The fish tank with a function of discharging waste water from a bottom thereof, according to claim 1, wherein by the fan-shaped water outlet assembly, the tank water withdrawn by the submerged water pumping motor is bypassed to the external breeder box, and the water flow to the breeder box is adjusted.

\* \* \* \* \*